United States Patent

[11] 3,582,108

| [72] | Inventor | Ewell Lee Carlton<br>11850 Edgewater Drive, Cleveland, Ohio 44107 |
|---|---|---|
| [21] | Appl. No. | 762,882 |
| [22] | Filed | Sept. 26, 1968 |
| [45] | Patented | June 1, 1971 |

[54] VEHICLE SPLASH GUARD
4 Claims, 9 Drawing Figs.

[52] U.S. Cl. .................................................. 280/154.5, 161/111
[51] Int. Cl. ...................................................... B62d 25/18
[50] Field of Search ............................................ 280/152, 152.1, 153, 154.5; 298/1 (SG); 161/4, 111, 112, 113; 40/125 (I), 208; D14/(6.5)

[56] References Cited
UNITED STATES PATENTS

| 3,279,818 | 10/1966 | Jones | 280/154.5 |
| 2,619,363 | 11/1952 | Wenham et al. | 280/154.5 |
| 2,699,955 | 1/1955 | Eaves et al. | 280/154.5 |
| 2,843,954 | 7/1958 | Rheeling | 280/154.5(X) |
| 3,096,596 | 7/1963 | Magnuson et al. | 161/4(X) |
| 3,405,025 | 10/1968 | Goldman | 161/4 |

*Primary Examiner*—Kenneth H. Betts
*Assistant Examiner*—Leslie J. Paperner
*Attorney*—J. H. Slough

ABSTRACT: A louvered sheet metal core is coated with a thermoplastic resin, either totally, such as to completely fill the openings in the metal, or partially whereby small apertures are left in the splash guard. In manufacture, the core is heated and then disposed within an agitated atmosphere having finely divided particles of solid plastic entrained therein or is dipped in a thermoplastic melt. Reflective material is applied to the soft plastic and adheres thereto.

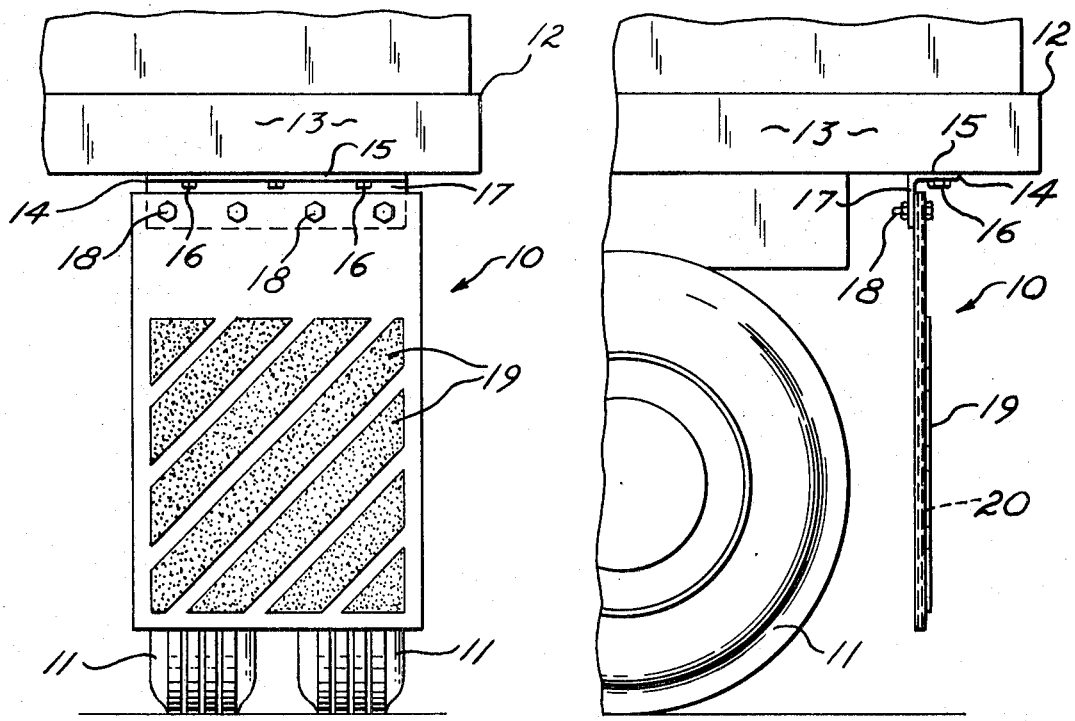
Fig. 1    Fig. 2
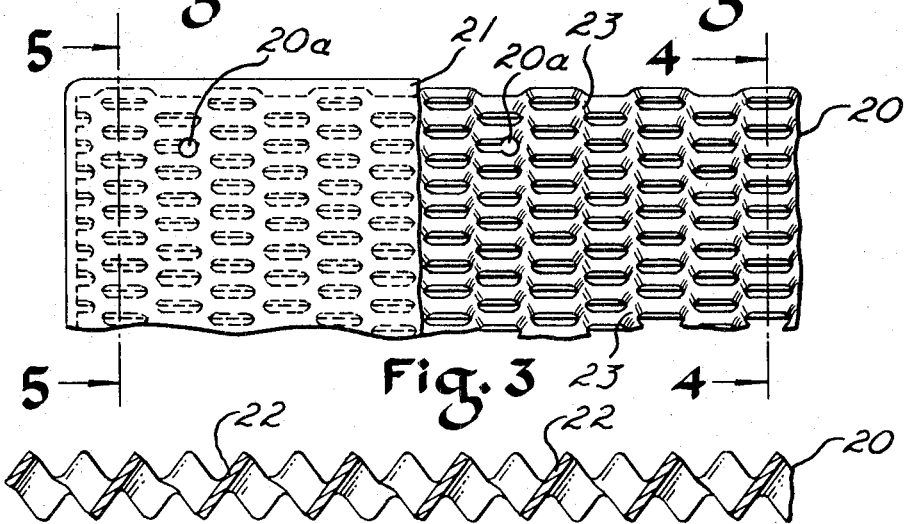
Fig. 3
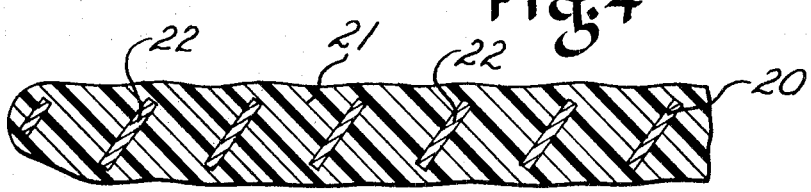
Fig. 4
Fig. 5
INVENTOR
Ewell Lee Carlton
BY
J.H. SLOUGH
ATTORNEY

VEHICLE SPLASH GUARD

This invention relates to vehicle splash guards which are particularly adapted for use behind the rear wheels of heavy trucks, commercial trailers, and the like. The invention also relates to methods of manufacturing the splash guard.

Vehicles of the type referred to are commonly provided with load carrying beds or body portions which extend rearwardly beyond single or dual supporting rear wheels. Fenders are not ordinarily provided whereby moisture, mud, rocks, dust and other debris are thrown rearwardly by the rear wheels thereby creating hazardous conditions for vehicles approaching from behind. Splash guards, which generally comprise thick sheets of rubber or rubberlike material, are required by law to be suspended from the overhanging truck bed behind the rear wheels of the vehicle to protect the oncoming vehicles. Splash guards commonly in use are objectionable for various reasons. If the guard is too flexible, it tends to "sail" when the vehicle is in motion thereby uncovering part of the rear wheels and allowing debris to be thrown rearwardly. Where wooden or metal stiffeners are used, the stiffeners tend to break or bend, especially when the vehicle is backed up to a loading dock and the guard is caught between a rear wheel and the dock, as often happens.

It is further desirable that reflective material in an attention-getting pattern be carried on the rearwardly directed surface of the guard both as a safety feature and for advertising purposes. In splash guards of known types, the application of such reflective material is difficult and expensive and retention qualities are poor under the severe conditions of use to which the guards are subjected.

The present invention in the form herein disclosed comprises louvered sheet metal coated with a thermoplastic resin either totally, such as to completely fill the openings in the metal, or partially whereby small apertures are left in the splash guard. One preferred method of manufacture comprises heating the metal and passing the same through an agitated atmosphere having finely divided particles of dry thermoplastic resin entrained therein. Another preferred method comprises dipping the heated metal in a hot plastic melt. Reflective material in granular form, such as glass beads, mica, or other reflective material, may be applied to the plastic while it is still soft to attract the attention of approaching motorists.

It is an object of the present invention to provide a vehicle splash guard of the type referred to which effectively resists flapping or "sailing" and deflects rearwardly thrown debris in an improved manner.

Another object of the invention is to provide such a splash guard which is highly resistant to distortion, ripping, or tearing in use thereof.

Still another object is to provide a splash guard which also serves as a safety reflector for motorists approaching the vehicle from behind.

A further object is to provide a splash guard which allows a limited amount of air to pass therethrough while deflecting moisture and flying debris.

Yet another object is to provide methods for manufacturing splash guards of the type set forth above.

Other objects of the invention and the invention itself will be readily apparent from the following description of the invention and the accompanying drawings, in which said drawings:

FIG. 1 is a rear elevational view of a first embodiment of the vehicle splash guard of this invention mounted behind dual truck wheels, only a portion of the truck being shown;

FIG. 2 is an edge view of the splash guard and a side view of the truck portion of FIG. 1;

FIG. 3 is an enlarged, fragmentary view of a corner portion of the splash guard, a portion of the plastic being removed to expose the metal core;

FIG. 4 is a section taken along the line 4-4 of FIG. 3;

FIG. 5 is a section taken along the line 5-5 of FIG. 3;

Figure 6:
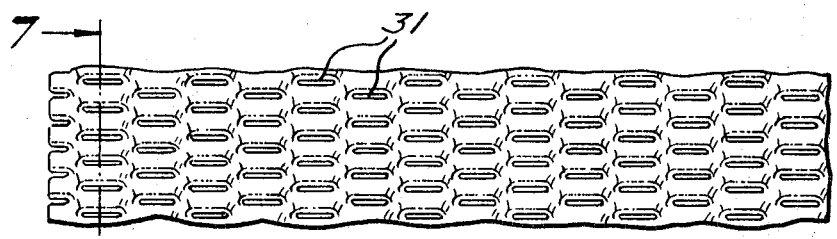
FIG. 6 is a fragmentary view of a splash guard according to a second embodiment of the invention.

Referring now to the drawings in all of which like parts are designated by like reference numerals, the splash guard of this invention is generally indicated at 10 in FIGS. 1 and 2 and is shown mounted behind a pair of dual wheels 11 of a truck 12. It will be noted that the load carrying portion or bed of the truck, indicated by the numeral 13, projects rearwardly of the dual wheels 11, and that the splash guard 10 is connected at its upper end to the underside of said bed by an elongated angle bracket 14. The bracket 14 is transversely disposed with respect to the truck, having a horizontal flange 15 secured flatwise beneath the bed 13 by bolts 16, and a downwardly directed vertical flange 17 to which the upper end of the splash guard is secured by nut and bolt assemblies 18. The splash guard 10 as herein illustrated has the normal shape of splash guards; that is, it is of rectangular shape with the longer dimension being in the vertical direction. However, it will be understood that the exact shape of the splash guard is not critical to the present invention.

The rearwardly directed surface of the splash guard 10 is provided with granular reflective material 19 preferably disposed in an attention-getting pattern such as the oblique stripes herein illustrated. The reflective material 19 may, if preferred, be in the form of a name, picture, or design for advertising purposes or it may carry a warning message to approaching motorists, as desired.

The construction of the splash guard 10 illustrated in FIGS. 1 and 2 is detailed in the enlarged illustrations of FIGS. 3—5. Said splash guard comprises a sheet metal core 20 completely encased within a plastic resin 21. The resin 21 may be of any suitable type such as a polyvinyl chloride, polyethylene, or neoprene. The sheet metal core 20 is preferably apertured in some manner and as herein illustrated is formed with a uniform pattern of louvers 22. As detailed in FIG. 4, the louvers 22 are formed by upsetting the metal in a uniform pattern at an angle oblique to the general plane of the metal with each louver extending laterally a relatively short distance and there being uncut or unlouvered metal as indicated at 23 between the louvers 22. As seen in FIG. 3, the louvers are disposed in vertical rows and are staggered whereby a louver in any one row is disposed transversely between the planes of two adjacent louvers of an adjacent row. Bolt holes 20a are provided adjacent to the top of the splash guard to receive the nut and bolt assemblies 18.

As shown in FIG. 5, in the first form of the invention the plastic resin completely encases the louvered sheet metal core 20, said resin extending through and interlocking with the spaces between the louvers 22. It will be understood that other forms of sheet metal core may be used such as that commonly known as expanded metal or the like.

Figure 7:
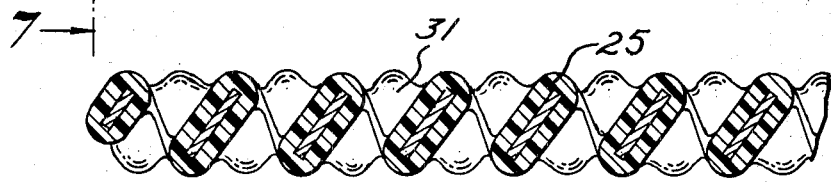
FIG. 7 is a section taken along the line 7-7 of FIG. 6.

The modified form of the invention as shown in FIGS. 6 and 7 differs from the first embodiment in that the plastic resin coating, indicated at 25 (FIG. 7), does not completely fill the spaces between the louvers 22 but does extend over the edges of and completely encase said louvers. In FIG. 6, there is shown a portion of a modified splash guard 30 built around the same type of louvered sheet metal core 20 as disclosed in the first embodiment but wherein the finished splash guard is provided with oblique openings 31 between adjacent pairs of the louvers 22. In this form of the invention, the splash guard 30 is preferably hung behind the wheels 11 with the louvers disposed transversely and horizontally as seen from the back of the truck and with each louver being slanted downwardly in a rearward direction.

The modified splash guard 30 has the advantage that a certain amount of airflow through the splash guard is afforded thus reducing its resistance to the wind flow when the vehicle is in motion. While allowing some air to flow through the splash guard, water and debris are effectively stopped to protect vehicles following the truck. The flow-through feature of the modified splash guard also reduces the tendency of the guard to flap or sail thereby increasing the effectiveness thereof.

Figure 8:
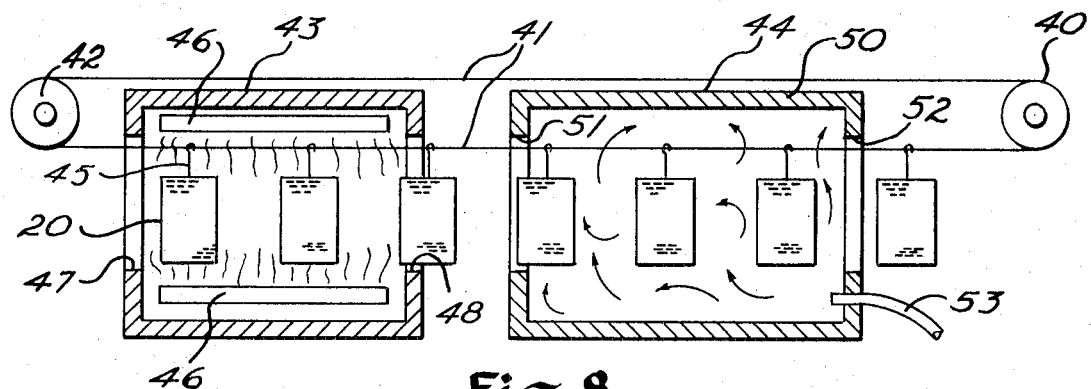
FIGS. 8 and 9 are simplified views of apparatus for manufacturing the splash guards of this invention.

FIG. 8 shows a first method for making or manufacturing the splash guard of this invention. Simple apparatus shown by way of example comprises a conveyor 40 having an endless cable 41 engaging pulley wheels 42, which said cable sequentially passes through a heater or oven 43 and a coating chamber 44. Sheet metal cores 20 are suspended below the cable 41 by hooks 45 whereby they are conveyed from left to right as shown in FIG. 8, first through the heater or oven 43 and then through the chamber 44. The oven 43 may be provided with any suitable heating elements such as radiant tubes 46 whereby the metal is heated to approximately 450° F. before passing into the chamber 44. The temperature to which the sheet metal cores 20 are raised may be controlled by conventional thermostatic control means (not herein illustrated) and by the rate of travel of the conveyor which is preferably driven by suitable, conventional motor means (also not herein illustrated). The sheet metal cores 20 enter at the left side of the oven 43 through a suitable opening 47 and leave said oven through another suitable opening 48 on the right-hand side of the oven as illustrated. The pulley wheels 42 may be mounted upon vertical axes whereby the endless cable 41 lies in a single, horizontal plane and whereby the plastic covered metal cores can be carried to another station for applying reflective material 19 thereto.

The chamber 44 comprises a housing 50 having an entrance opening 51 on the left-hand side and an exit opening 52 on the right-hand side. Air is blown into the chamber 44 through a hose 53 which projects into the housing 50. Finely divided particles of plastic in a solid state are either entrained within the air blown through the tube 53 or otherwise suitably introduced into the chamber 44 whereby said particles are caused to swirl about in the flowing air and are kept suspended in a constantly agitated atmosphere. The particles thus entrained in the swirling and agitated atmosphere melt upon striking the heated metal cores 20 and build up thereon to form a coating which completely encases the metal. The thickness of the plastic coat is controlled by the length of time that the cores 20 take to pass through the chamber 44 or may be controlled by passing said core through a coating chamber a number of times. If the cores are retained in the chamber 44 long enough or are passed therethrough often enough, the plastic coating will build up to the point where the spaces between the louvers 22 are completely filled thereby providing a solid splash guard of the type shown in the first embodiment and detailed in FIG. 5. By exposing the cores to the swirling atmosphere a shorter length of time, a splash guard according to the second embodiment of the invention wherein oblique openings 31 are left between the louvers 22 will be produced.

It is preferred that the reflective material 19 be applied to the splash guards while the plastic is still soft whereby the same will adhere thereto without the need for additional bonding material. The reflective material, which may comprise glass beads, mica, or the like, is preferably applied through a suitable stencil and may be blown on, shaken on, or pressed into the soft plastic.

Figure 9:
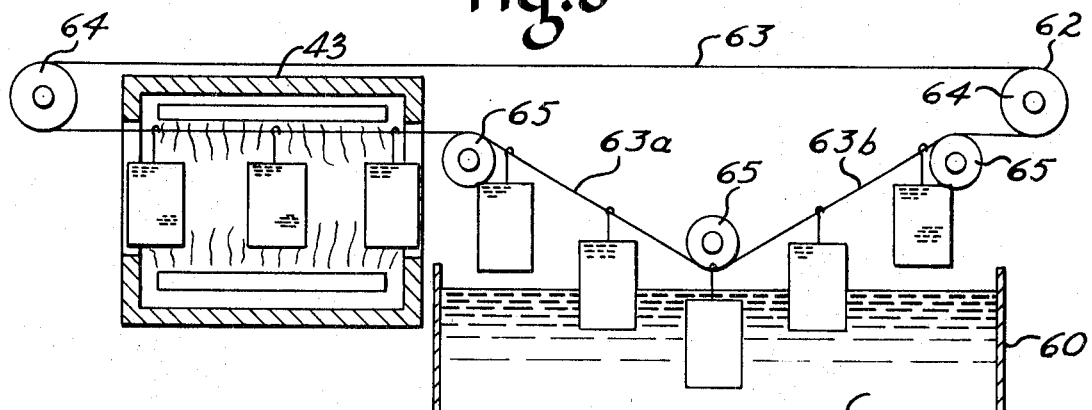

FIG. 9 shows an alternative method for producing the splash guard of this invention which differs from the method of FIG. 8 in that the metal cores 20 are dipped in the thermoplastic material while it is in a molten state. As herein illustrated, simple apparatus for performing the second method comprises a heater 43 of the type shown in FIG. 8 in combination with an open top container 60 containing a bath of molten plastic indicated at 61. A conveyor 62 is provided, said conveyor comprising an endless cable 63 mounted upon a series of pulley wheels 64 and 65 whereby the cores 20 are conveyed from left to right through the heater or oven 43, downwardly into the bath 61 at a descending portion of the cable indicated at 63a, and upwardly out of said bath on an ascending portion of the cable indicated at 63b. The amount of plastic which builds up on the cores 20 in the second embodiment is controlled by controlling the viscosity of the bath 61 and may be further determined by providing repeated dips in said bath.

It will be seen that the present invention provides a splash guard which is lighter in weight than conventional splash guards made of rubber, asphalt, or the like, due both to the fact that the plastic itself is lighter and, further, that a lesser amount is needed to manufacture the splash guard. The present invention also has the advantage that the plastic is available in a wide variety of eye-catching colors thus adding to the safety feature of the guard. The reflective material 19 is literally embedded within the plastic of the splash guard whereby it adheres thereto in a manner superior to known bonding methods and surface application.

What I claim is:

1. A vehicle splash guard comprising a substantially flat, sheet metal core having an overall uniform pattern of closely spaced openings therethrough formed by upsetting the metal whereby portions of the metal are disposed at an angle with respect to the general plane of the core; said core having a plastic coating covering the surface and edge portions of said sheet metal core including the surface and edge portions of said upset, angled portions whereby said splash guard is provided with an overall uniform pattern of openings extending through the coated core to allow air to flow through said splash guard when the vehicle to which it is mounted is moving.

2. A vehicle splash guard as set forth in claim 1: at least part of the rear surfaces of said splash guard having reflective material in granular form embedded in the plastic coating.

3. A vehicle splash guard comprising a core of louvered sheet metal; said core having a uniform pattern of closely spaced louvers formed therein and disposed at an angle with respect to the general plane of said core; said louvers formed by upsetting the sheet metal and thereby providing openings in said core; said core having a coating of resilient plastic resin covering the surface and edge portions of said sheet metal core and said louvers whereby said splash guard is provided with an overall uniform pattern of plastic covered louvers defining openings.

4. A vehicle splash guard as set forth in claim 3: the rear surface of said splash guard having reflective material in granular form embedded in the plastic coating thereof.